(12) United States Patent
Hauser et al.

(10) Patent No.: US 12,012,124 B2
(45) Date of Patent: Jun. 18, 2024

(54) MINING OR CONSTRUCTION VEHICLE ASSISTANCE SYSTEM

(71) Applicant: HEXAGON GEOSYSTEMS SERVICES AG, Heerbrugg (CH)

(72) Inventors: Fabian Hauser, Seedorf (CH); Marcos Bayuelo, Zürich (CH); Barbara Hirtz, Zürich (CH); Fabien Kritter, Rüschlikon (CH)

(73) Assignee: HEXAGON GEOSYSTEMS SERVICES AG, Heerbrugg (CH)

( * ) Notice: Subject to any disclaimer, the term of this patent is extended or adjusted under 35 U.S.C. 154(b) by 162 days.

(21) Appl. No.: 16/926,674

(22) Filed: Jul. 11, 2020

(65) Prior Publication Data

US 2021/0009160 A1 Jan. 14, 2021

(30) Foreign Application Priority Data

Jul. 12, 2019 (EP) .................................... 19186040

(51) Int. Cl.
*B60W 60/00* (2020.01)
*B60W 30/095* (2012.01)
(Continued)

(52) U.S. Cl.
CPC .... *B60W 60/0015* (2020.02); *B60W 30/0953* (2013.01); *B60W 30/10* (2013.01);
(Continued)

(58) Field of Classification Search
CPC ......... B60W 60/0015; B60W 30/0953; B60W 30/10; B60W 50/14; B60W 60/0011;
(Continued)

(56) References Cited

U.S. PATENT DOCUMENTS 9,562,784 B2 * 2/2017 Lewis .................. G07C 5/0816
2009/0256722 A1 * 10/2009 Mase .................... G08G 1/0955
340/907

(Continued)

FOREIGN PATENT DOCUMENTS

EP 3 722 753 A1 10/2020

OTHER PUBLICATIONS

European Search Report dated Mar. 12, 2019 as received in application No. 19186040.2.

*Primary Examiner* — Jaime Figueroa
*Assistant Examiner* — Madison B Emmett
(74) *Attorney, Agent, or Firm* — Maschoff Brennan

(57) ABSTRACT

A vehicle assistance system comprising a computer and a client device. The computer is configured to receive an identification reference and a current position of the first vehicle, provide a route of the first vehicle based on the identification reference and the current position of the first vehicle, receiving an identification reference and current position of a second vehicle, providing a route of the second vehicle based on the identification reference and the current position of the second vehicle, detect an expected location where the route of the first and second vehicle intersect or overlap, detect an expected time when the first and second vehicle intersect at the expected location, generate adaptation data based on the expected location and the expected time, the adaptation data representing an adaptation of a route parameter of the route of the first or second vehicle, sending the adaptation data to the client device.

22 Claims, 4 Drawing Sheets

(51) Int. Cl.
*B60W 30/10* (2006.01)
*B60W 50/14* (2020.01)
*G01C 21/34* (2006.01)
*G01C 21/36* (2006.01)

(52) U.S. Cl.
CPC ........ *B60W 50/14* (2013.01); *B60W 60/0011* (2020.02); *G01C 21/3415* (2013.01); *G01C 21/3664* (2013.01); *B60W 2510/20* (2013.01); *B60W 2520/00* (2013.01)

(58) Field of Classification Search
CPC .......... B60W 2510/20; B60W 2520/00; G01C 21/3415; G01C 21/3664; G05D 2201/021; G05D 1/0289
See application file for complete search history.

(56) References Cited

U.S. PATENT DOCUMENTS

| | | | |
|---|---|---|---|
| 2013/0035978 A1* | 2/2013 | Richardson | G06Q 50/08 |
| | | | 705/7.27 |
| 2013/0054133 A1 | 2/2013 | Lewis et al. | |
| 2014/0297182 A1* | 10/2014 | Casson | G08G 1/205 |
| | | | 701/537 |
| 2014/0330596 A1* | 11/2014 | Depura | B60W 40/09 |
| | | | 701/33.4 |
| 2015/0276416 A1* | 10/2015 | Yamasaki | G08G 1/20 |
| | | | 701/537 |
| 2016/0325675 A1 | 11/2016 | Bharwani | |
| 2016/0355184 A1* | 12/2016 | Ruth | B60W 10/04 |
| 2017/0205241 A1* | 7/2017 | Lewis | G07C 5/0841 |
| 2017/0221364 A1 | 8/2017 | Povey et al. | |

\* cited by examiner

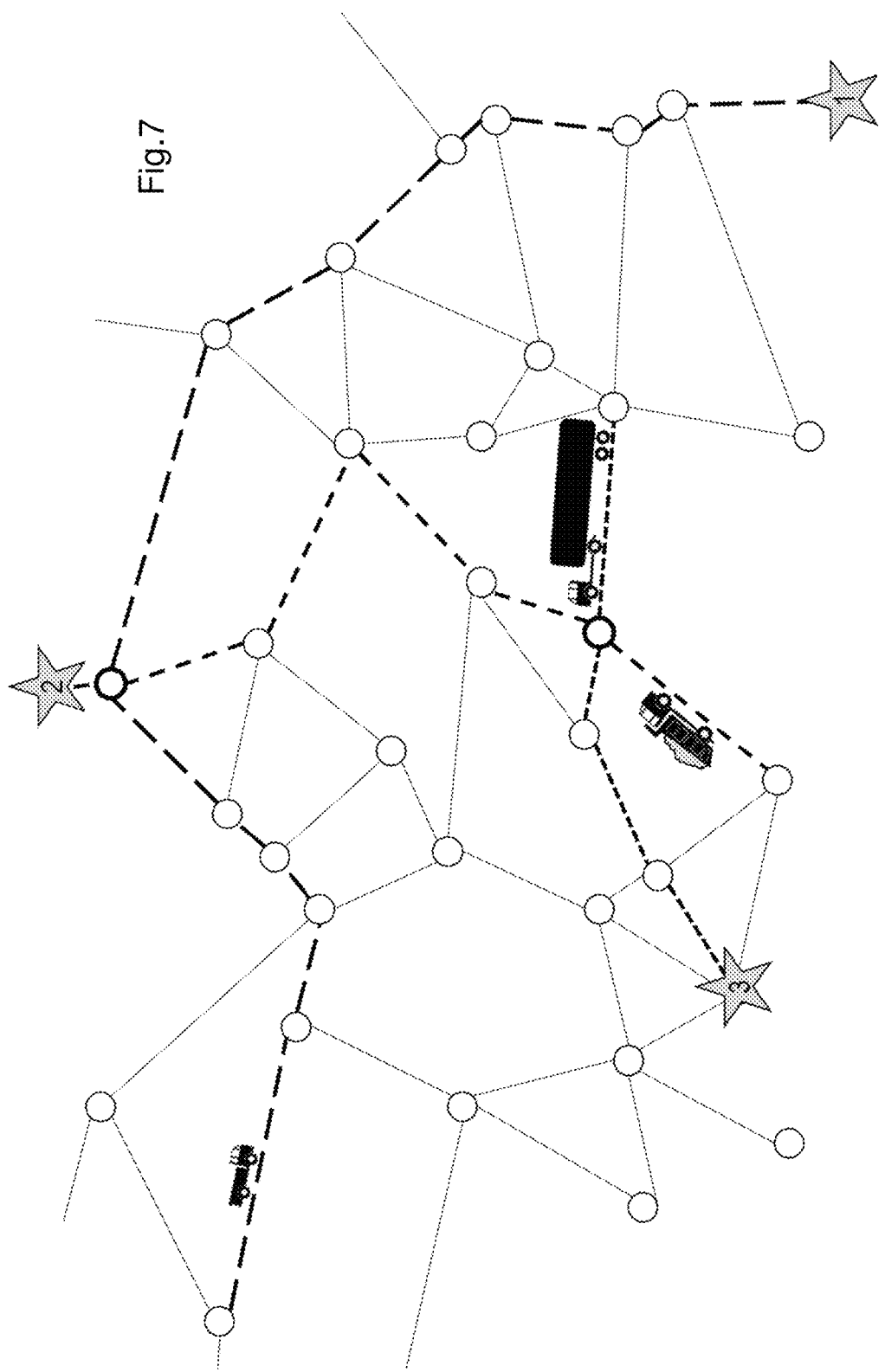

MINING OR CONSTRUCTION VEHICLE ASSISTANCE SYSTEM

CROSS-REFERENCE TO RELATED APPLICATIONS

This application claims priority to European Patent Application No. 19186040.2, filed on Jul. 12, 2019. The foregoing patent application is herein incorporated by reference.

FIELD OF THE INVENTION

The present invention relates to a vehicle assistance system for roads on a construction site or a mining site.

BACKGROUND OF THE INVENTION

Vehicle operations on mining or construction sites need coordination that go beyond the capabilities of a common navigational system. The circumstances in such places are entirely different from common street traffic. The road network is usually more complex and slinging instead of a rectangular and orderly structure known from car roads. There are usually a lot more slopes, dusty roads, changing road conditions, and even sometimes changing of entire road positions. Further, the vehicles involved are not seldom heavily loaded and their safe navigation through the site is very important to the workers involved. Furthermore, running a mining or construction site is very cost intense and therefore the navigation should also advantageously result in a frictionless transportation of goods without unnecessary interruption.

OBJECT OF THE INVENTION

The present invention provides a vehicle assistance system that significantly increases safety and efficiency on construction or mining sites.

SUMMARY OF THE INVENTION

Some aspects of the invention relate to a vehicle assistance system for haul roads on a construction site or a mining site, comprising a computer and a client device, the computer configured for receiving an identification reference of a first vehicle, receiving a current position of the first vehicle, providing a route of the first vehicle based on the identification reference of the first vehicle and the current position of the first vehicle, receiving an identification reference of a second vehicle, receiving a current position of the second vehicle, providing a route of the second vehicle based on the identification reference of the second vehicle and the current position of the second vehicle, detecting an expected location where the route of the first vehicle and the route of the second vehicle intersect or overlap, detecting an expected time when the first vehicle and the second vehicle intersect at the expected location, generating adaptation data based on the expected location and the expected time, the adaptation data representing an adaptation of a route parameter of the route of the first or second vehicle, or a driving parameter of the first vehicle or of the second vehicle, sending the adaptation data to the client device, the client device configured for being carried in the first or second vehicle, receiving the adaptation data, and outputting an assistance signal based on the adaptation data.

The assistance signal may comprise a control command, wherein the vehicle assistance system comprises an automated vehicle control configured for adapting a driving behaviour of the first or second vehicle based on the control command, in particular wherein the driving behaviour relates to a speed limit, a cruise control speed, or a planned route of the respective vehicle.

The assistance signal may comprise a user interface command, wherein the vehicle assistance system comprises a user interface configured for emitting a visual, acoustical, or haptic signal based on the user interface command, in particular wherein the visual, acoustical, or haptic signal is interpretable by a user of the first or second vehicle as a recommendation to adjust at least one of a driving speed, a steering angle, a planned route of the respective vehicle in order to avoid congestion.

The computer may be configured for (a) storing, (b) retrieving, in particular retrieving from a fleet management system, (c) computing based on a respective stored or retrieved destination, or (d) predicting based on the current position of the respective vehicle, at least one of the route of the first vehicle and the route of the second vehicle.

The assistance signal may be indicative for which vehicle has right of way.

The route parameter may comprise (a) a selection of at least one of various alternative routes, (b) a redirection, or (c) a waiting position, for the respective vehicle.

The driving parameter may relate to a driving speed or a steering angle of the respective vehicle.

At least one of generating the adaptation data and outputting the assistance signal may be based on (a) vehicle categories of the first and second vehicle, wherein the respective vehicle category is determinable by the computer or the client device based on the identification reference of the respective vehicle, or (b) vehicle state information of the first and second vehicle, the vehicle state information relating to at least one of an emergency state, a fuel state, a vehicle load state, a vehicle inclination state, a driving speed state, and a position state, wherein the computer or the client device is configured for obtaining the respective vehicle state information by (i) retrieving it from a database or from the respective vehicle in real time, or (ii) determining it based on the identification reference of the respective vehicle.

In an embodiment, either both detecting the expected location and detecting the expected time, or generating adaptation data are based on a slope and/or width of a haul road laying on the route of the first and the second vehicle.

In another embodiment, either both detecting an expected location and detecting an expected time ramps, or generating adaptation data is based on a condition of a haul road or crossroads area laying on the route of the first and second vehicle, the condition relating to quality and/or obstacles, wherein the computer is configured for storing or retrieving condition data representing the condition.

In a further embodiment, both detecting an expected location and detecting an expected time ramps, or generating adaptation data is based on an evaluation of an efficiency of the roads, wherein the evaluation is based on a history of speeds and/or speed variances with which other vehicles have been driving on the roads, wherein the computer is configured for storing, retrieving, or generating the evaluation.

The assistance signal may comprise or be designed to cause a view of a graphical user interface of a navigation system of the first or second vehicle in that (a) non-drivable or non-recommendable roads are marked, (in particular greyed out or provided with a thinner or thicker line) or (b) only roads are shown on a map, which are drivable or recommendable, in particular depending on the vehicle category of the first or second vehicle and/or depending on a condition of a haul road or crossroads area laying on the route of the first vehicle and the route of the second vehicle, the condition relating to quality and/or obstacles.

The vehicle assistance system may further comprise a lane assistance system configured for (a) causing the first or second vehicle to follow a more efficient track within the haul road, (b) recommending a drive of the first or second vehicle to follow a more efficient track within the haul road, or (c) warning of a lane departure, in particular along with a correction indication, based on the assistance signal.

In particular, the adaptation of the route parameter or the driving parameter aims at reducing a risk of a potential collision between the first and second vehicle, or aims at increasing an efficiency of a travel of the first or second vehicle.

The vehicle assistance system may further comprise a warning system configured for generating a warning signal based on a map of the construction site or mining site provided by the computer, further based on the assistance signal and on a history of data records of vehicles that drove on the construction site or mining site, wherein the warning signal warns a driver of the first or second vehicle of a potential risk.

BRIEF DESCRIPTION OF THE DRAWINGS

By way of example only, preferred embodiments of the invention will be described more fully hereinafter with reference to the accompanying figures, wherein:

FIG. 7 shows the abstracted road map of FIG. 3 with three different vehicle routes and two route crossings;

DETAILED DESCRIPTION OF THE DRAWINGS

Generating and/or maintaining a map of a construction site or a mining site is a special challenge, as discussed in European Patent Application No. 19 168 545.2. Crossroads areas (junctions) are very often not rectangular in contrast to regular automobile roads. Accordingly, known approaches for map generations of regular roads cannot be applied to construction sites or mining sites as such approaches use a junction detection based on heading change and speed change. Many junctions in construction and mining environments have fluent road passages and there are several other reasons for driving slowly besides junctions. Also, on construction and mining sites, there are often special areas with a lot of traffic but actually no streets.

Figure 1:
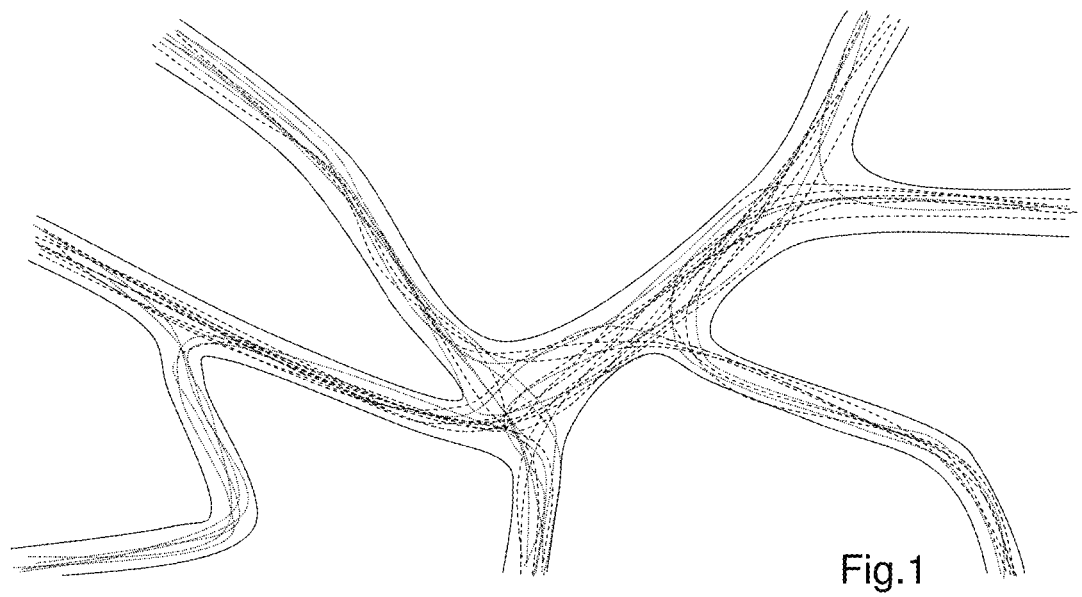
FIG. 1 shows mapped trips based on data records collected by vehicles driving on the road network of a construction site or mining site.

Therein, data records are collected by vehicles equipped with a GNSS-positioning system while driving on the construction site or mining site as can be seen in FIG. 1. Each data record comprises a position information representing a two-dimensional or three-dimensional position of the corresponding vehicle, an identification reference specific to the corresponding vehicle, a time tag indicating the point in time when the data record was produced, a heading information indicative for the current alignment of the corresponding vehicle, and particularly also a speed information. The data records are then assigned to corresponding trips based on the time tags and the identification references, wherein the trips are mapped within an area as exemplarily shown in FIG. 1. A complex processing in particular of the junction areas is following, wherein a map is generated based on establishing the precise position and configuration of the junctions and on connecting the junctions with road segments in order to have a clean road map model, see FIG. 2.

The present invention is meant to be taking advantage of this outcome of the road map generation method as disclosed in said European Patent Application No. 19 168 545.2. But also, the invention is using the data records based on which the road map was generated but also new data records which are still collected and which might not be used for the map generation. These data records serve as "history data" of all vehicles ever driving on the regarding site roads. In particular, this provides knowledge about where vehicles usually drive fast, where they slow down, which type of vehicle drives where fast or slow, whether there are favoured routes which drivers of a particular vehicle type choose for some reason (e.g. road steepness), whether there are preferred parts/sides of the lane which are mostly used for some reason (e.g. obstacles), and so on.

Figure 2:
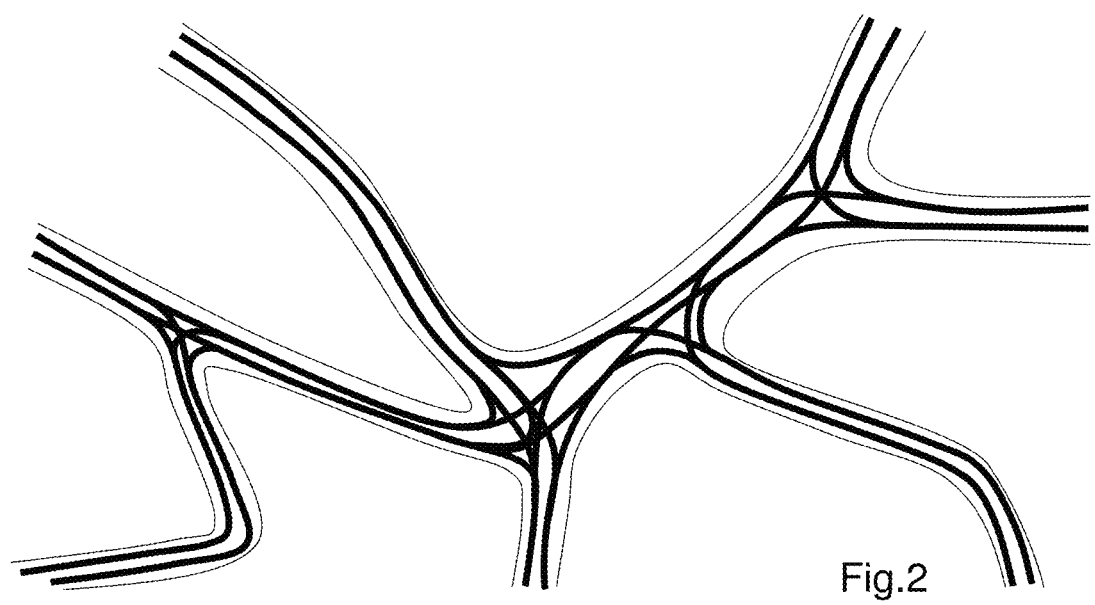
FIG. 2 shows refined lanes of a road map generated based at least on the data records.

FIG. 1 shows mapped data records of a small section of a construction or mining site, with long lines meaning this vehicle drove relatively fast, and with short lines or dots meaning the vehicle drove relatively slow. The frequency with which the data records are collected by the vehicles is particularly constant. FIG. 2 is a clean map section as a result of computing the mapped data records. The way the map is generated plays no role for the present invention, but the way presented above is a preferred one. Having recourse to newly collected data records is also optional but advantageous.

Figure 3:
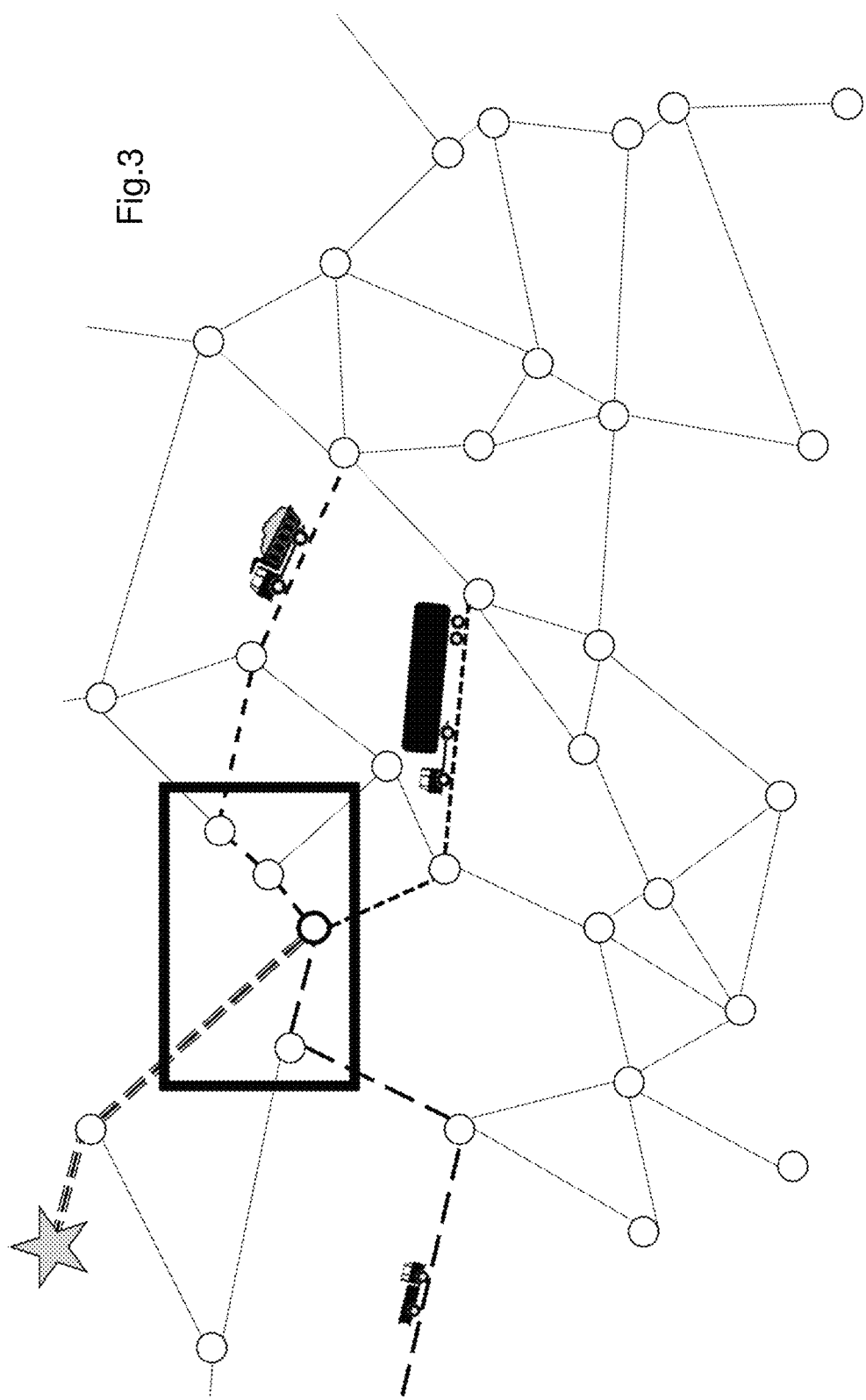
FIG. 3 shows an abstracted road map on which three different vehicles have routes which are predicted to meet in one junction and overlap for two road segments.

FIG. 3 shows an abstracted view of the complete map of the construction or mining site. The section shown in FIGS. 1 and 2 is framed in FIG. 3. Eastbound, a small truck can be seen travelling with relatively high speed (long lines) and heading to the starred destination. A mid-size dump truck is driving westbound with mid speed also heading to the same destination (star). A big heavy-duty truck is also traveling westbound (but south from the dump truck) towards the very same destination with low speed (short dashes) compared to the other two vehicles.

The circles represent junctions which are interconnected by road segments. Generally, i.e. without considering other factors like arrival time, the planned paths of the three vehicles are crossing at one specific junction which is inside the frame that covers the area shown in FIGS. 1 and 2. The last two road segments before the destination is achieved will be travelled by all three vehicles, which is indicated by the triple-lined dashes.

On construction or mining sites, it is not uncommon that vehicles need to cross a junction at the same time. Therefore, such crossing point might be a problem. For example, when they all enter the junction at the same time, which vehicle will have right of way or will the junction be a bottle-neck such that a collision-free travel is at stake? Other things are to be considered in case two or all three vehicles have a different arrival time at the crossroads. It would certainly make sense that the fast vehicle will be first, otherwise it would need to overtake the other vehicle(s). If the last two road segments before arrival at the destination have wide lanes, overtaking might not be a problem but what if they are narrow? Also, these roads could have slope which causes the heavy-duty truck or the dump truck to need to slow down even more. Then it is of course particularly favourable to have the speedy vehicle go first through the crossroads where the three routes meet.

According to the invention, a vehicle assistance system takes care of managing traffic on a road network of construction or mining sites and significantly reduces risks and increases operative efficiency. The vehicle assistance system comprises a computer and a client device. The client device is carried by a vehicle. In particular, there are at least two vehicles each carrying such a client device. At least part of the computer can be part of the client device(s). However, preferably the computer is embodied as a remote server which is wirelessly connected to the client device(s).

The three vehicles from the example shown in the figures all have such a client device and they are each assigned to a particular identification reference (e.g. ID number or name). The computer is able to receive the identification references and also the current position of the vehicles. The vehicles are equipped with a positioning system (e.g. GNSS-based). Based on the current positions of the vehicles and their identification references, the computer can compute respective routes that would lead the vehicles to their destination. For example, the computer is able to retrieve a corresponding destination assigned to the vehicle identification reference in an operating schedule, where it is unambiguously coordinated which vehicle is currently out on the site and where it is going.

Having at least two different routes, the computer is now able to detect if there is an expected location where the routes of the vehicles are intersecting or overlapping. In the shown example, the expected location is not only the crossroads where they all meet at first, but also the remaining two road segments towards the destination, because their routes are overlapped here. Particularly based on the current positions of the vehicles, the computer will now detect an expected time at which the vehicles will meet at the expected location.

Based on the expected time and expected location, the computer can now generate adaptation data which are indicative for an adaptation of either: (a) a route parameter of any vehicle's route, such as a redirection, offerings of alternative route(s) or a waiting position; or (b) a driving parameter of any vehicle, such as the travel speed or the steering angle. These adaptation data are sent to the client device which interprets them to output an assistance signal. The adaptation of the route parameter or the driving parameter can aim at reducing a risk of a potential threat (like a collision) and/or at increasing an efficiency of travel. Efficiency can be measured by time, fuel and/or load.

The assistance signal can e.g. be a machine-readable signal (control signal) and/or be directed to be perceived by humans (UI signal). The assistance signal can comprise a control command that can be interpreted by an automated vehicle control for adapting the driving behaviour of the respective vehicle. Not necessarily, but in this exemplary case, the adaptation data can be identical with the assistance signal. For instance, the speed of the vehicle can be limited (either in cruise control or the drivers capability to accelerate is restricted) or the speed can be controlled such that the vehicle is driving fully or partially autonomously and the speed is permanently adapted. Driving fully autonomously also includes steering and route choice (e.g. including detours).

The vehicle assistance system can also comprise a user interface (UI), such as a screen, a head-up-display, warning lamps, indicating lamps, a loudspeaker, or force-feedback vibration motors (e.g. in the steering wheel). The assistance signal can accordingly comprise a user interface command which is interpretable by said user interface. The user interface can then output a visual, acoustical, or haptic signal that the user understands as recommendation to adjust a driving speed and/or a steering angle in order to avoid congestion or a collision. That is, in a particular embodiment, the adaptation data which can be considered raw data are processed into the assistance signal (UI command) which can be interpreted by the UI.

An assistance signal can especially contain information about which vehicle has right of way at a certain junction. As described, this can be expressed in many ways. In particular, the routes are stored, retrieved (from a database), computed based on a respective stored or retrieved destination, or predicted based on the current position of the respective vehicle.

At least one of generating the adaptation data and outputting the assistance signal is particularly based a vehicle category of the respective vehicle which gives knowledge about gross vehicle weight, dimensions, and/or engine power. By calculating this information in, the whole coordination gets even more precise. What can also be taken into account are vehicle state information of the vehicle(s), wherein the vehicle state information relates to at least one of an emergency state, a fuel state, a vehicle load state, a vehicle inclination state, speed state, and position state. The computer and/or the client device can be configured for obtaining the respective vehicle state information by (a) retrieving them from a database or from the respective vehicle in real time, or (b) determining them based on the identification reference of the respective vehicle, i.e. they can be retrieved from a database or they can be derived from the known planned route of the vehicle (e.g. from a loading area to a dumping area).

Figure 4:
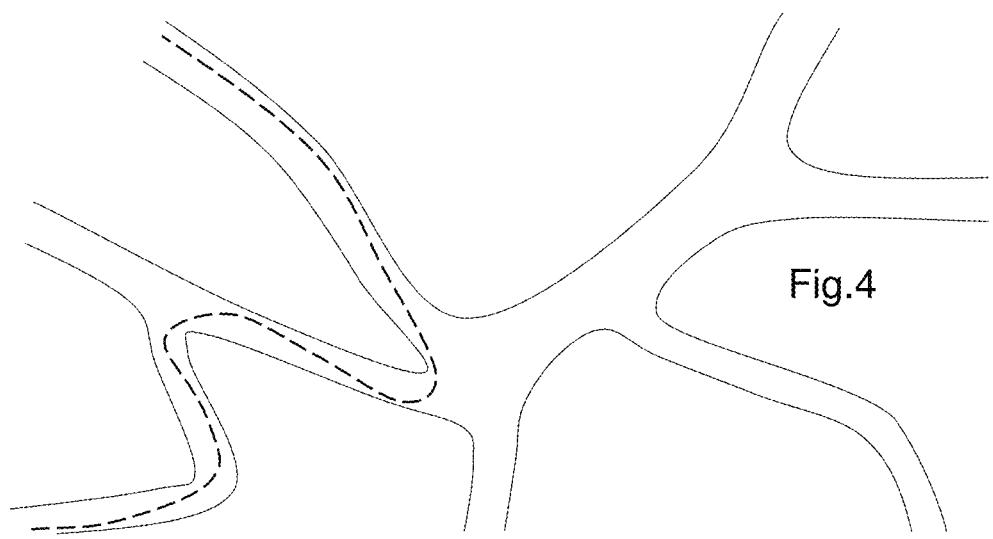
FIGS. 4-6 show the different routes and driving speeds of the three vehicles from FIG. 3.
Figure 5:
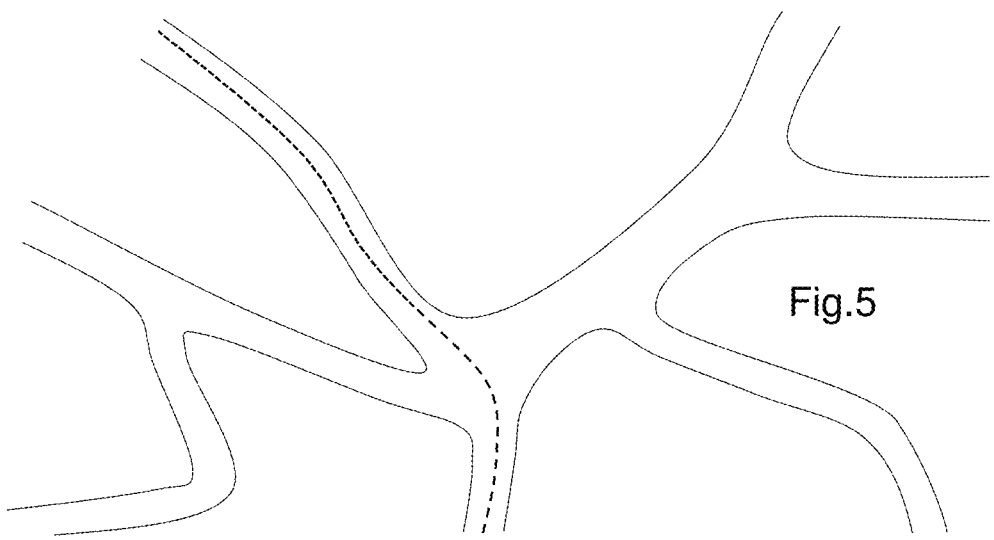
Figure 6:
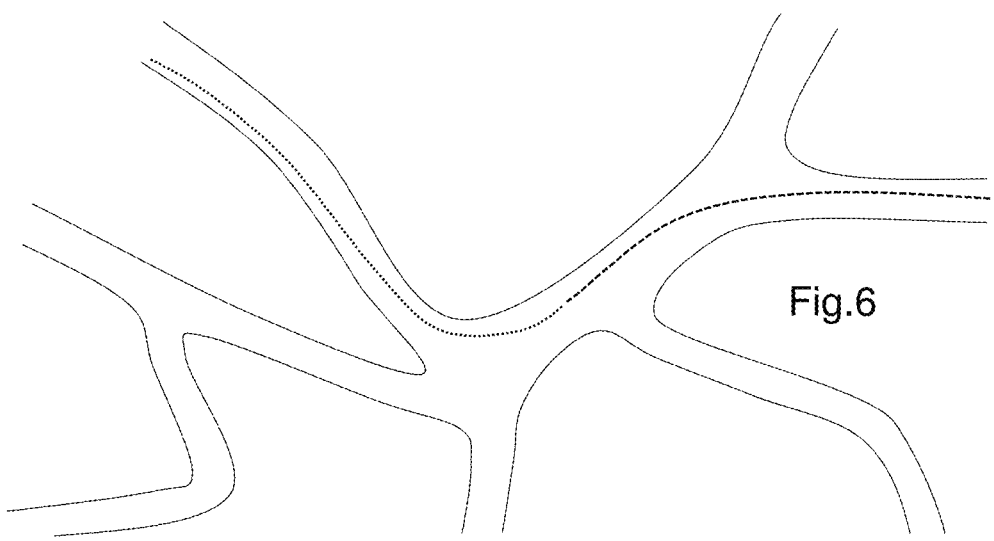

Both detecting the expected location and detecting the expected time can be based on a slope and/or width of a road laying on the route of the vehicles. For example, in FIG. 5 (route of the mid-size truck) and FIG. 6 (route of the heavy truck) it can be seen that both vehicles need to slow down at the first road segment after the junction. The reason might be that this road goes quite steeply up or down. The light vehicle is not affected by this slope can travel with a substantially constant speed (see FIG. 4).

However, the slope and/or width of the road can also be taken into account when generating the adaptation data. For example, because the system knows that the road ahead goes downhill, it can already provide the driver or the vehicle control with supporting signals. Another example is a narrow road ahead will expectedly cause a bottle-neck because another vehicle comes towards. Then the system can provide a warning signal or adapt the driving behaviour automatically. Furthermore, when a heavy truck needs to accelerate from a standstill it costs a lot of time and fuel. That is why the system can be used to smoothen the drive speed of the vehicles.

Again (a) both detecting an expected location and detecting an expected time ramps, or (b) generating adaptation data can be based on a condition of the road or the junction which are on the route of the vehicles or on an efficiency evaluation of the roads. The condition can be expressed in machine-interpretable condition data and can be retrieved from a database which can be updated. For example, the drivers can input condition data in order to notify the server of new obstacles or potholes, etc. The efficiency valuations can additionally or alternatively be based on a history of speeds and/or speed variances with which other vehicles have been driving on the roads, wherein the computer is configured for storing, retrieving, or generating said evaluations. The evaluations could especially be deducted from the map generation method described in context of FIGS. 1 and 2: From these data, it can be recognised when, statistically, many vehicles drive slower than they actually could in a specific location (inefficient road), or when they can reach their top speed or the speed limit (efficient road). To find this out, knowledge about the vehicle category is again necessary to find out what are the specifics of the vehicle.

Additionally, or alternatively, the obstacles or dangers or road condition problems can be also reported automatically. For such a function the vehicle can comprise of an IMU that detects heavy shaking or shocks and thereby can interpret that a bad road condition must be given at this location. In particular, this information—whether it was reported manually or automatically—could be used by the system to send out a grader that can heal the road condition and repair the broken spot.

A graphical user interface (GUI), which can particularly be combined with said user interface (UI), and which can be comprised by a vehicle, can provide a view to the driver, said view being similar to how navigational systems look like nowadays. Herein, non-drivable or non-recommendable roads can be shown greyed-out, marked with some other colour, line style, or line width indicative for such warning. Alternatively, only those roads can be shown that are drivable or recommendable. The warning of non-drivability or non-recommendation can be based on above mentioned road quality, efficiency, or manual inputs (e.g. maximum load of a bridge). In addition, the GUI or UI could also show the road conditions (e.g. potholes), traffic condition (e.g. congestion or empty), obstacles, and/or road construction.

The vehicle assistance system can also comprise a lane assistance system which can guide the vehicle a more efficient path within the scope of the road. For example, a road is muddy on the one side but fairly flat and stiff on the other, the assistance system could lead the drive towards this more efficient part of the road, even though it might not be the shortest one. Again, this could be just a recommendation communicated to the driver, or the system can actively interfere into the driving of the vehicle. The system could also warn if the vehicle departs from a preferred or more safe track. The lane assistance system can particularly also warn a driver of the vehicles of oncoming or approaching vehicles, in particular in curves or when approaching an obstacles or a road narrows.

Entirely dedicated to warnings, the assistance system can also comprise a warning system that is trained to warn the drivers at the site of any dangers or risks. Such warning system can be provided with a map of the construction site or mining site, the assistance signal and a history of data records of many vehicles that drove on the road network of the site.

The vehicle assistance system might also be configured to detect queues or congestions on the route, wherein the driver or the vehicle could be directed to slow down to save fuel because he would need to wait later on anyway.

FIG. 7 shows a modified situation compared to the one explained with FIG. 3. This time, there is no overlap of the routes, and instead, two problematic route crossings are detected. The small truck has a destination 1, the mid-size dump truck has a destination 2, and the big heavy-duty truck has a destination 3. Firstly, the mid-size dump truck approaches the same junction as the big heavy-duty truck approaches. The system recognises this crossing and also that the two vehicles will arrive there at the same or roughly the same moment, which potentially leads to a conflict. Secondly, after the mid-size dump truck continued from this first problematic junction, there will predictably be a second problematic junction northbound, where it will meet the relatively speedy small truck shortly before the destination 2.

At the problematic junctions, the system controls the right of way. For example, the heavy-duty truck has priority because it would cost a lot of time and fuel to have it stop and wait for the mid-size truck. Therefore, the system instructs the driver of the mid-size truck to slow down or to wait for a while until the heavy truck passed the crossroads. In the second case, the system could indicate to the driver of the small and speedy vehicle that if it continued to drive as it currently drives (given that it could actually drive faster because its top speed and/or the permitted speed is not reached), then there could be a conflict at the fifth-next junction. Additionally, or alternatively, the mid-size truck could be instructed to slow down a bit.

It is the general motivation of the vehicle assistance system to reduce the amount of false warnings and to constantly improve in precision. This goal can be achieved by taking into account more data, i.e. the history data records that were mentioned above.

Although the invention is illustrated above, partly with reference to some preferred embodiments, it must be understood that numerous modifications and combinations of different features of the embodiments can be made. All of these modifications lie within the scope of the appended claims.

What is claimed is:

1. A vehicle assistance system for haul roads, the vehicle assistance system comprising:
   a computer configured to:
      receive an identification reference of a first vehicle,
      receive a current position of the first vehicle,
      provide a route of the first vehicle based on the identification reference of the first vehicle and the current position of the first vehicle,
      receive an identification reference of a second vehicle,
      receive a current position of the second vehicle,
      provide a route of the second vehicle based on the identification reference of the second vehicle and the current position of the second vehicle,
      detect an expected location where the route of the first vehicle and the route of the second vehicle intersect or overlap,
      detect an expected time when the first vehicle and the second vehicle intersect at the expected location,
      generate adaptation data based on the expected location and the expected time, the adaptation data representing adaptation of:
         a route parameter of the route of the first or second vehicle, wherein the route parameter comprises:
            a selection of at least one of various alternative routes,
            a redirection, or
            a waiting position, for the respective vehicle
         and
         a driving parameter of the first vehicle or of the second vehicle, and
      sending the adaptation data to the client device; and
   a client device configured to:
      being carried in the first or second vehicle,
      receiving the adaptation data, and
      outputting an assistance signal based on the adaptation data wherein the assistance signal comprises a control command, wherein the vehicle assistance system comprises an automated vehicle control configured to adapt a driving behaviour of the first or second vehicle based on the control command, and wherein the generating adaptation data is based on an evaluation of an efficiency of the roads, the evaluation is based on a history of speeds or speed variances with which other vehicles have been driving on the roads, and wherein the history of speeds or speed variances is based on data records collected by vehicles equipped with a GNSS-positioning system while driving on the roads, wherein each data record comprises a position information representing a two-dimensional or three-dimensional position of a corresponding vehicle, an identification reference specific to the corresponding vehicle, a time tag indicating the point in time when the data record was produced, a heading information of the corresponding vehicle, and a speed information of the corresponding vehicle, and the computer is configured for storing, retrieving, or generating the evaluation.

2. The vehicle assistance system according to claim 1, wherein the computer is further configured to store, retrieve, and compute, based on a respective stored or retrieved destination, or predict based on the current position of the respective vehicle, at least one of the routes of the first vehicle and the route of the second vehicle.

3. The vehicle assistance system according to claim 1, wherein the assistance signal is indicative for which vehicle has right of way.

4. The vehicle assistance system according to claim 1, wherein the driving parameter relates to a driving speed or a steering angle of the respective vehicle.

5. The vehicle assistance system according to claim 1, wherein at least one of generating the adaptation data and outputting the assistance signal is based on:

vehicle categories of the first and second vehicle, wherein the respective vehicle category is determinable by the computer or the client device based on the identification reference of the respective vehicle, or vehicle state information of the first and second vehicle, the vehicle state information relating to at least one of an emergency state, a fuel state, a vehicle load state, a vehicle inclination state, a driving speed state, and a position state, wherein the computer or the client device is configured for obtaining the respective vehicle state information by:

retrieving the respective vehicle state information from a database or from the respective vehicle in real time, or determining it based on the identification reference of the respective vehicle.

6. The vehicle assistance system according to claim 1, wherein either both detecting the expected location and detecting the expected time, or generating adaptation data is based on a slope or width of a haul road laying on the route of the first and the second vehicle.

7. The vehicle assistance system according to claim 1, wherein:

at least one of the detecting an expected location, the detecting an expected time ramps, or the generating adaptation data is based on a condition of a haul road or crossroads area laying on the route of the first and second vehicle, the condition relating to quality or obstacles, and the computer is configured for storing or retrieving condition data representing the condition.

8. The vehicle assistance system according to claim 1, wherein:

the assistance signal comprises or causes a view of a graphical user interface of a navigation system of the first or second vehicle wherein:

non-drivable or non-recommendable roads are marked, or only roads are shown on a map, which are drivable or recommendable.

9. The vehicle assistance system according to claim 1, comprising a lane assistance system configured to perform at least one of the following, based on the assistance signal:

cause the first or second vehicle to follow a more efficient track within the haul road, recommend a drive of the first or second vehicle to follow a more efficient track within the haul road, and warn of a lane departure.

10. The vehicle assistance system according to claim 1, wherein the adaptation of the route parameter or the driving parameter:

reduces a risk of a potential collision between the first and second vehicle, or increases an efficiency of a travel of the first or second vehicle.

11. The vehicle assistance system according claim 1, further comprising a warning system configured for generating a warning signal based on a map of the construction site or mining site provided by the computer, further based on the assistance signal and on a history of data records of vehicles that drove on the construction site or mining site, wherein the warning signal warns a driver of the first or second vehicle of a potential risk.

12. A vehicle assistance system for haul roads, the vehicle assistance system comprising:

a computer configured to perform the following during operation of a first vehicle and a second vehicle:

receive an identification reference of the first vehicle, receive a current position of the first vehicle, provide a route of the first vehicle based on the identification reference of the first vehicle and the current position of the first vehicle, receive an identification reference of the second vehicle, receive a current position of the second vehicle, provide a route of the second vehicle based on the identification reference of the second vehicle and the current position of the second vehicle, detect an expected location where the route of the first vehicle and the route of the second vehicle intersect or overlap, detect an expected time when the first vehicle and the second vehicle intersect at the expected location, generate adaptation data based on the expected location and the expected time, the adaptation data representing adaptation of:

a route parameter of the route of the first or second vehicle, a route parameter of the route of the first or second vehicle, wherein the route parameter comprises:

a selection of at least one of various alternative routes, a redirection, or a waiting position, for the respective vehicle and a driving parameter of the first vehicle or of the second vehicle, and wirelessly send the adaptation data to a client device during the operation of the first vehicle and second vehicle; and the client device wirelessly connected to the computer and configured to:

be carried in the first or second vehicle during the operation of the first vehicle and second vehicle, wirelessly receive the adaptation data, and output an assistance signal based on the adaptation data during the operation of the first vehicle and second vehicle, wherein the assistance signal comprises a user interface command, wherein the vehicle assistance system further comprises a user interface configured to emit a visual, acoustical, or haptic signal based on the user interface command, wherein the generating adaptation data is based on an evaluation of an efficiency of the roads, the evaluation is based on a history of speeds or speed variances with which other vehicles have been driving on the roads, and wherein the history of speeds or speed variances is based on data records collected by vehicles equipped with a GNSS-positioning system while driving on the roads, wherein each data record comprises a position information representing a two-dimensional or three-dimensional position of a corresponding vehicle, an identification reference specific to the corresponding vehicle, a time tag indicating the point in time when the data record was produced, a heading information of the corresponding vehicle, and a speed information of the corresponding vehicle, and the computer is configured for storing, retrieving, or generating the evaluation.

13. The vehicle assistance system according to claim 12, wherein the computer is further configured to store, retrieve, and compute, based on a respective stored or retrieved destination, or predict based on the current position of the respective vehicle, at least one of the route of the first vehicle and the route of the second vehicle.

14. The vehicle assistance system according to claim 12, wherein the assistance signal is indicative for which vehicle has right of way.

15. The vehicle assistance system according to claim 12, wherein the driving parameter relates to a driving speed or a steering angle of the respective vehicle.

16. The vehicle assistance system according to claim 12, wherein at least one of generating the adaptation data and outputting the assistance signal is based on:

vehicle categories of the first and second vehicle, wherein the respective vehicle category is determinable by the computer or the client device based on the identification reference of the respective vehicle, or vehicle state information of the first and second vehicle, the vehicle state information relating to at least one of an emergency state, a fuel state, a vehicle load state, a vehicle inclination state, a driving speed state, and a position state, wherein the computer or the client device is configured for obtaining the respective vehicle state information by:

retrieving the respective vehicle state information from a database or from the respective vehicle in real time, or determining it based on the identification reference of the respective vehicle.

17. The vehicle assistance system according to claim 12, wherein either both detecting the expected location and detecting the expected time, or generating adaptation data is based on a slope or width of a haul road laying on the route of the first and the second vehicle.

18. The vehicle assistance system according to claim 12, wherein:

at least one of the detecting an expected location, the detecting an expected time ramps, or the generating adaptation data is based on a condition of a haul road or crossroads area laying on the route of the first and second vehicle, the condition relating to quality or obstacles, and the computer is configured for storing or retrieving condition data representing the condition.

19. The vehicle assistance system according to claim 12, wherein:

the assistance signal comprises or causes a view of a graphical user interface of a navigation system of the first or second vehicle wherein:

non-drivable or non-recommendable roads are marked, or only roads are shown on a map, which are drivable or recommendable.

20. The vehicle assistance system according to claim 12, comprising a lane assistance system configured to perform at least one of the following, based on the assistance signal:

cause the first or second vehicle to follow a more efficient track within the haul road, recommend a drive of the first or second vehicle to follow a more efficient track within the haul road, and warn of a lane departure.

21. The vehicle assistance system according to claim 12, wherein the adaptation of the route parameter or the driving parameter:

reduces a risk of a potential collision between the first and second vehicle, or increases an efficiency of a travel of the first or second vehicle.

22. The vehicle assistance system according claim 12, further comprising a warning system configured for generating a warning signal based on a map of the construction site or mining site provided by the computer, further based on the assistance signal and on a history of data records of vehicles that drove on the construction site or mining site, wherein the warning signal warns a driver of the first or second vehicle of a potential risk.

* * * * *